May 15, 1951    G. R. GROCE    2,553,085
CONTAINER PRINTING MACHINE
Filed July 7, 1948    5 Sheets-Sheet 1
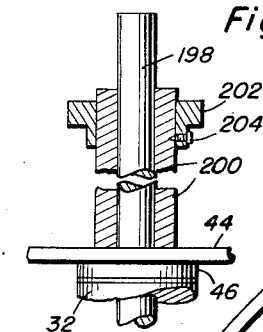
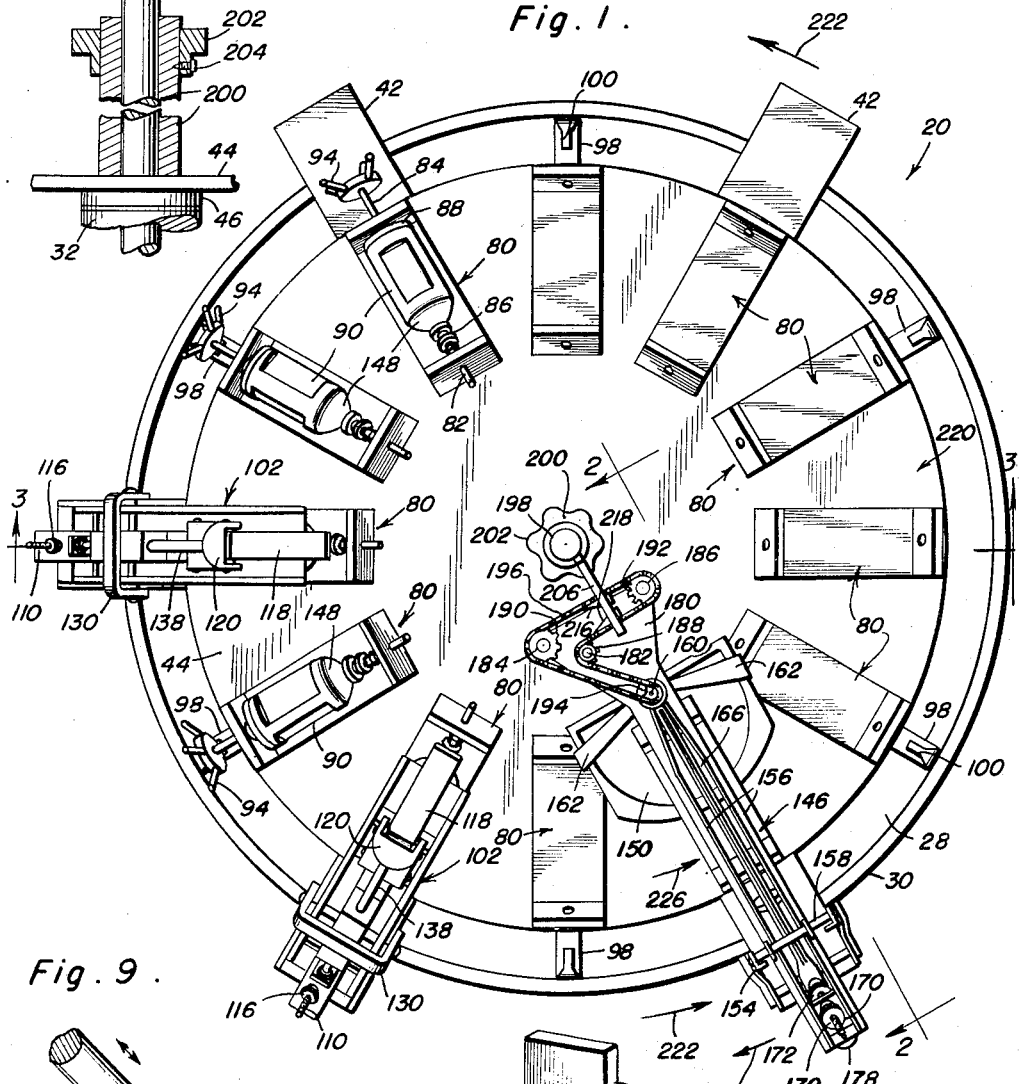
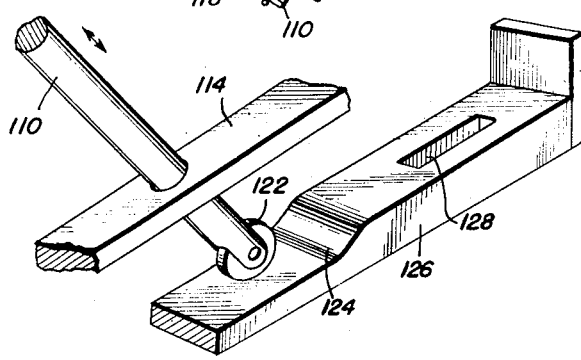
George R. Groce
*INVENTOR.*

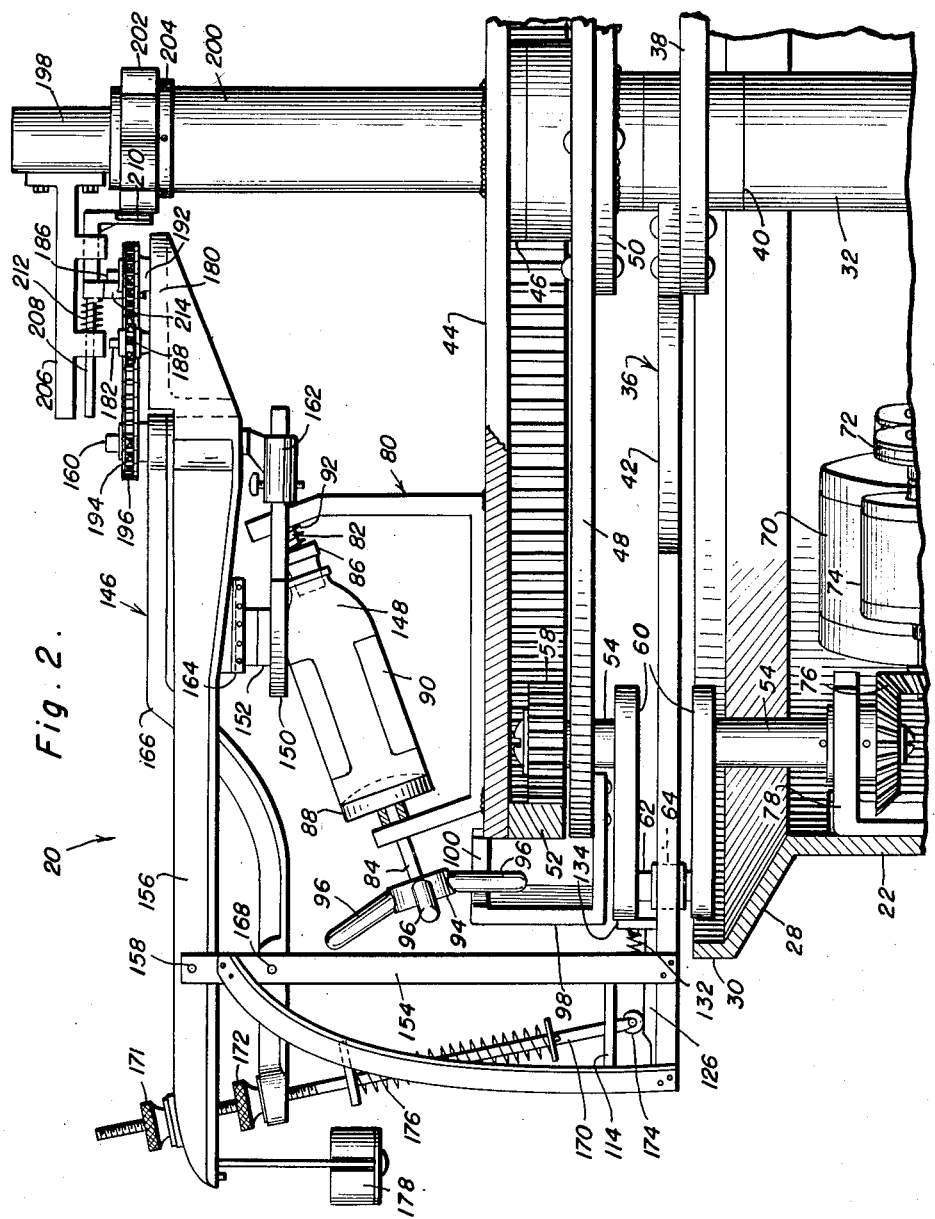

May 15, 1951  G. R. GROCE  2,553,085
CONTAINER PRINTING MACHINE
Filed July 7, 1948  5 Sheets-Sheet 3
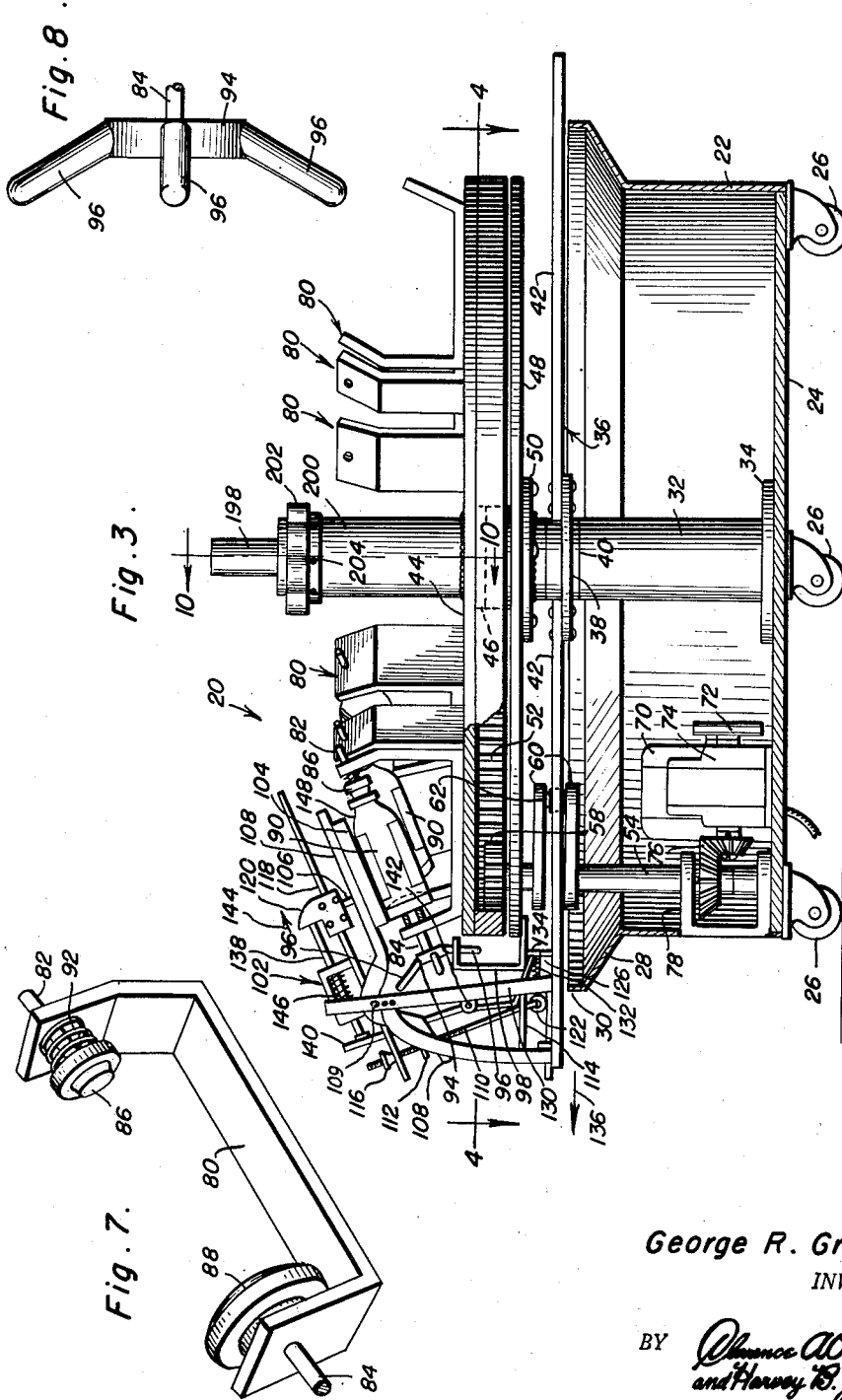
George R. Groce
INVENTOR.

May 15, 1951 G. R. GROCE 2,553,085
CONTAINER PRINTING MACHINE
Filed July 7, 1948 5 Sheets-Sheet 4

George R. Groce
INVENTOR.

May 15, 1951    G. R. GROCE    2,553,085
CONTAINER PRINTING MACHINE
Filed July 7, 1948    5 Sheets-Sheet 5

George R. Groce
INVENTOR.

BY *Clarence A. O'Brien*
*and Harvey B. Jacobson*
Attorneys

Patented May 15, 1951

2,553,085

UNITED STATES PATENT OFFICE 2,553,085

CONTAINER PRINTING MACHINE

George R. Groce, Vienna, W. Va., assignor of forty-nine per cent to Walter V. Burkey, Parkersburg, W. Va.

Application July 7, 1948, Serial No. 37,473

9 Claims. (Cl. 101—35)

This invention relates to new and useful improvements and structural refinements in printing machines, more specifically, printing machines employing the well-known silk screen and squeegee arrangement, and the principal object of the invention is to facilitate the printing of inscriptions, or the like, on sides and neck portions of multi-sided containers such as bottles, etc., in one continuous operation.

This object is achieved by the provision of the instant printing machine wherein the containers are carried in indexible holders upon a rotatable platform, while oscillatory printing units of conventional type are brought into and out of engagement successively with the sides and neck portions of the containers, the latter being rotatably indexed at predetermined intervals, so that the printing units may come in engagement with the appropriate sides and neck portions thereof.

An important feature of the invention resides in the provision of means for holding and indexing the containers on the rotatable platform, and further means for supporting and oscillating the printing units in such manner that they may engage successively the appropriate sides and neck portions of the containers which are to be imprinted.

An additional feature of the invention resides in the provision of means for actuating the printing unit in synchronization with the oscillation thereof and with indexing of the containers and rotation of the platform on which they are carried.

An important advantage of the invention lies in its simplicity of construction and operation, and in its adaptability for use with containers of various sizes and types.

With the above more important objects and features in view and such other objects and features as may become apparent as this specification proceeds, the invention consists essentially of the construction and arrangement of parts as shown in the accompanying drawings in which:

Figure 1 is a top plan view of the invention, two of its five printing units being removed for simplicity of illustration;

Figure 2 is a fragmentary cross sectional view, taken substantially in the plane of the line 2—2 in Figure 1;

Figure 3 is a cross sectional view, taken substantially in the plane of the line 3—3 in Figure 1;

Figure 7 is a perspective view of one of the container holders used therein, a star-wheel portion of the latter being removed and illustrated in Figure 8;

Figure 8 is an elevational view of a star-wheel employed in association with the holder shown in Figure 7;

Figure 9 is a fragmentary perspective view of one of the slides and actuating rods used in the invention;

Figure 10 is a cross section view, taken substantially in the plane of the line 10—10 in Figure 3;

Like characters of reference are employed to designate like parts in the specification and throughout the several views.

Figure 4:
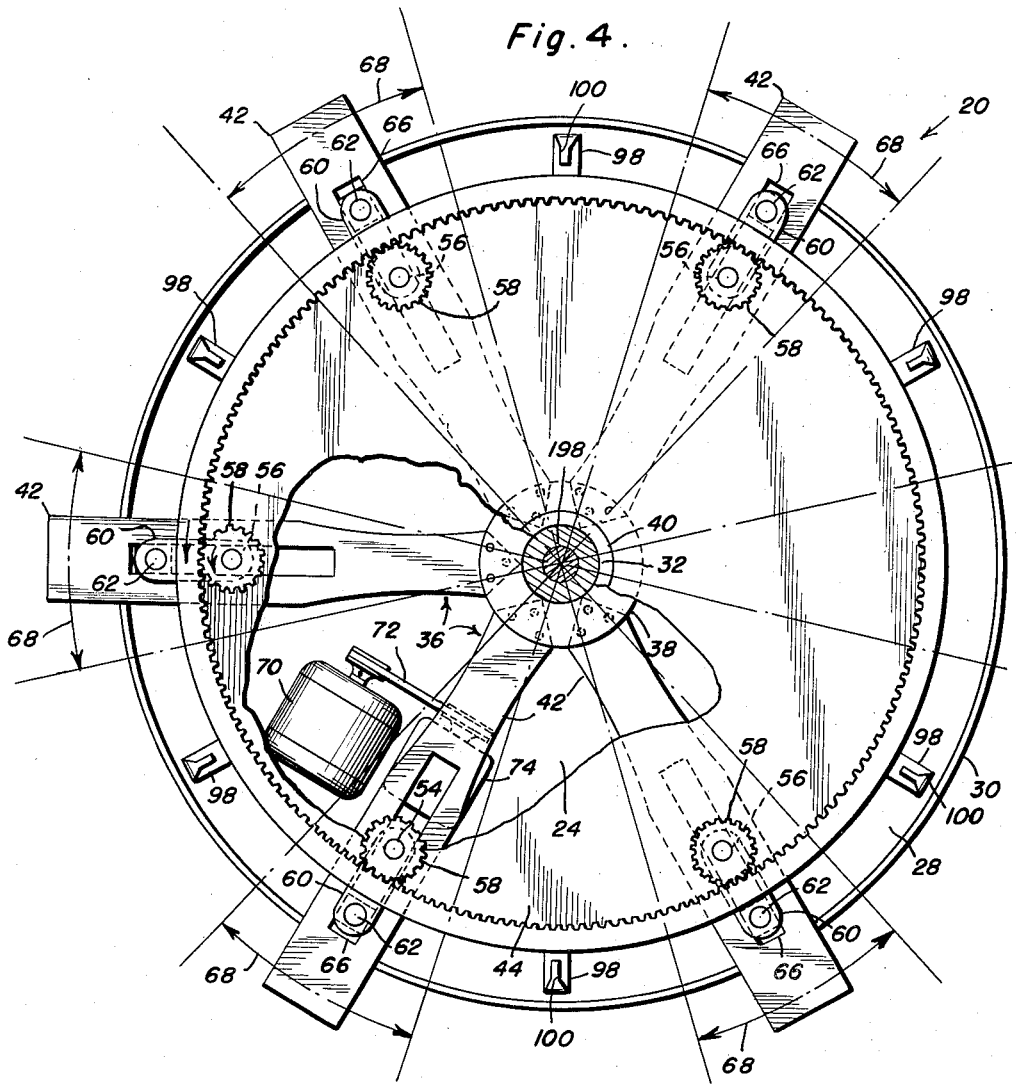
Figure 4 is a cross sectional view, taken substantially in the plane of the line 4—4 in Figure 3.

Referring now to the accompanying drawings in detail, the general reference character 20 designates a printing machine constructed in accordance with the teachings of the invention, the same embodying in its construction a substantially circular housing 22 (see Figure 3) provided with a bottom 24 which, in turn, is equipped with a plurality of suitable castors 26, whereby the entire machine is conveniently supported.

The upper end portion of the housing 22 is of a substantially frusto-conical configuration as indicated at 28, terminating in an upstanding rim 30. An upright standard 32, provided at its lower end with a mounting flange 34, is secured concentrically in the housing 22, the standard 32 extending upwardly from the housing and carrying an oscillatory carrier assembly 36 which is rotatably mounted on the standard, as will be presently described. The carrier assembly 36 consists of a central hub 38 secured to a sleeve 40 which is rotatable on the standard 32, the hub 38 being provided with a set of rigidly secured, radially extending arms 42. These arms project outwardly beyond the periphery of the aforementioned rim 30, and a circular platform 44 is rotatably mounted on the standard 32, being supported thereon by means of a suitable bearing sleeve 46, as will be clearly apparent. It is to be noted that the platform 44 is disposed above the carrier 36, and that the outer end portions of the arms 42 extend beyond the periphery of the platform, as is best shown in Figure 3.

However, a stationary circular plate 48 is interposed between the platform 44 and the carrier 36, being secured by means of a suitable flange 50 to the standard 32, substantially as shown. An internally toothed ring gear 52 is secured to the under side of the platform 44 immediately above the plate 48, and an upright driving shaft 54 and a plurality of driven shafts 56 are equipped at the upper ends thereof with suitable pinions 58 which mesh with the ring gear 52, as is best shown in Figures 2 and 3.

Figure 6:
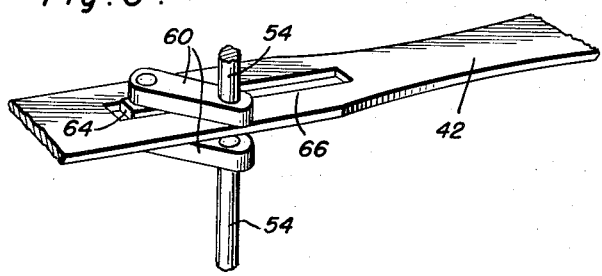
Figure 6 is a fragmentary perspective detail of one of the carrier arms and cranks used in the invention.

The shafts 54, 56 are provided intermediately the length thereof with suitable cranks 60 including crank pins 62, each of the latter being provided with a bushing block 64 which slidably engages a slot 66 formed in the carrier arms 42, substantially as shown in Figure 6.

It will be apparent from the foregoing that when the shaft 54 is rotated, the shafts 56 rotate simultaneously therewith by virtue of the ring gear 52 and pinions 58, this, in turn, resulting in the rotation of the platform 44 and in oscillation of the carrier 36 within the limits indicated by the arrows 68 in Figure 4.

The shaft 54 is rotated by an electric motor 70 mounted within the housing 22 upon the floor 24 of the latter, the motor 70 being connected by means of an endless belt drive 72 to a suitable reduction gear unit 74 which, in turn, drives the shaft 54 through the medium of bevel gearing 76.

The lower end portions of the shafts 54, 56 are rotatable in suitable bearings 78, and it should be understood that only the shaft 54 is driven directly by the motor 70, the shafts 56 being rotated in unison with the shaft 54 through the medium of the ring gear 52 and pinions 58. It will be apparent from the foregoing that when the motor 70 is energized, the platform 44 rotates continuously in one direction, while the carrier 36 oscillates as indicated at 68.

A set of container holders 80 are mounted (by welding or the like) upon the platform 44, each of these holders assuming the form of a substantially U-shaped yoke provided in the arms thereof with axially aligned indexing spindles 82, 84, these spindles carrying at the inner, opposed ends thereof substantially disk-shaped container engaging members 86, 88 respectively.

The containers themselves, assuming the form of multi-sided bottles 90 are receivable between the members 86, 88, and suitable compression springs 92 are provided on the spindles 82, whereby the containers or bottles are frictionally but rotatably held in position by the members 86, 88, as will be clearly apparent.

The spindles 84 of the holders 80 are equipped with star-shaped wheels 94 which include a set of projecting fingers 96, the number of these fingers corresponding to the number of the sides of the bottle to be printed. A set of substantially U-shaped brackets 98 are rigidly secured to the aforementioned stationary plate 48, these brackets extending outwardly and upwardly and having upper arms thereof provided with open recesses 100. It is to be noted that the fingers 96 of the wheels 94 project radially as well as outwardly, so that they may engage the recesses 100 of the brackets 98, the latter providing what may be referred to as tripping dogs for indexing the holders 80 and containers 90 therein. In other words, as the platform 44 rotates, the fingers 96 are brought successively in engagement with the brackets or tripping dogs 98 and matters are so arranged that at each such engagement the holders 80 are indexed sufficiently to turn the containers from one side to the next, as will be clearly understood.

The actual printing operation of the container sides is effected by means of a plurality of printing units 102, which are mounted at the outer end portions of all but one of the carrier arms 42.

These units are of a conventional type employing a screen 104 and a squeegee 106 (see Figure 3), and only such portions of the printing units will be described herein as pertain to or are effected by the instant invention.

Each of the printing units 102 includes, as aforesaid, a screen 104 mounted upon a limb 108 pivoted as at 109, (see Figure 3), rocking of this limb causing the screen 104 to be brought in and out of engagement with the sides of the containers 90 in the holders 80, so as to effect the printing operation. Rocking of the limbs 108 is effected by means of reciprocable actuating rods 110, the latter being provided with adjusting nuts 112 engaging the limbs 108, while their lower end portions are slidable in suitable guides 114. The rods 110 also carry further adjusting nuts 116 which engage a guide bar 118, the latter also being pivoted at 109 and carrying a slidable holder 120 for the aforementioned squeegee 106.

The lower ends of the rods 110 carry rotatable followers 122 which engage cam surfaces 124 provided upon suitable slides 126, each of the latter being slidable upon one of the carrier arms 42 and its movement being guided by a suitable pin (not shown) provided on the carrier arm and engaging a slot 128 with which the slides are equipped (see Figure 9).

The aforementioned pivots 109 are provided in suitable supports 130 secured to the outer end portions of the carrier arms 42, and suitable compression springs 132 are interposed between the lower end portions of the supports and upstanding pads 134 secured at the inner ends of the slides 126, as shown in Figure 9.

The pads 134 are engageable by the aforementioned cranks 60, so that when the cranks are rotated, they will become in contact with the pads 134 and drive the slides 126 outwardly, that is, in the direction of the arrow 136 in Figure 3, which movement, in turn, is transmitted through the medium of the actuating rods 110 to the limbs 108 and bars 118, thus causing the screens 104 together with the squeegees 106 to be brought in contact with the surfaces of the containers 90. Needless to say, after the cranks 60 become disengaged from the pads 134, the springs 132 will return the slides 126 and thereby facilitate disengagement of the screens 104 from the containers, after the printing operation has been effected.

The squeegee holders 120 are reciprocated on the guide bars 118 by spring pressed rods 138 which, in turn, are in operative engagement with suitable actuating rods 140 pivoted as at 142 to the aforementioned supports 130. The rods 140 engage the outer surfaces of the pads 134 as illustrated in Figure 3, so that when the slides 126 are moved in the direction of the arrow 136 by the cranks 60, the rods 140 will slide the holders 120 as indicated at 144. Needless to say, the springs 146 on the rods 138 will effectively return the squeegee holders 120 to their starting position after the cranks 60 are disengaged from the pads 134.

The remaining of the carrier arms 42 which is not equipped with one of the printing units 102 carries a printing unit 146 which is intended to print the neck portions 148 of the containers 90.

The unit 146 is also of conventional design, being provided with a printing screen 150 and with a squeegee 152, as is best shown in Figure 2. The unit 146 includes upstanding supports 154 secured to the carrier arm and provided with a limb 156 which is pivoted thereto as at 158. The inner end portion of the limb 156 provides bearings for a substantially upright shaft 160, the latter being provided at its lower end portion with suitable clamps 162 for supporting the printing screen 150.

The aforementioned squeegee 152 is carried by means of a holder 164 which, in turn, is attached to a further limb 166, the latter having one end portion thereof rotatably mounted on the aforementioned shaft 160, while being pivoted to the supports 154 as at 168.

A spring pressed actuating rod 170 carries two adjusting nuts 171, 172 engaging the limbs 156, 166 respectively, the actuating rod 170, like the aforementioned rod 110, being provided with a rotatable follower 174 in engagement with one of the slides 126. It will be apparent from the foregoing that the actuating rod 170, upon outward movement of the associated slide 126, will cause the limbs 156, 166 to bring the screen 150 and the squeegee 152 in engagement with the neck portions 148 of the containers 90, while the springs 176 on the rod 170 will disengage the screen 150 from the container after disengagement of the crank 60 from the slide 126. A suitable weight 178 may be provided at the outer end of the limb 156 for counterbalancing purposes, and it should be understood that either or both the weight 178 and the return 176 may also be employed in association with the aforementioned printing units 102.

Figure 5:
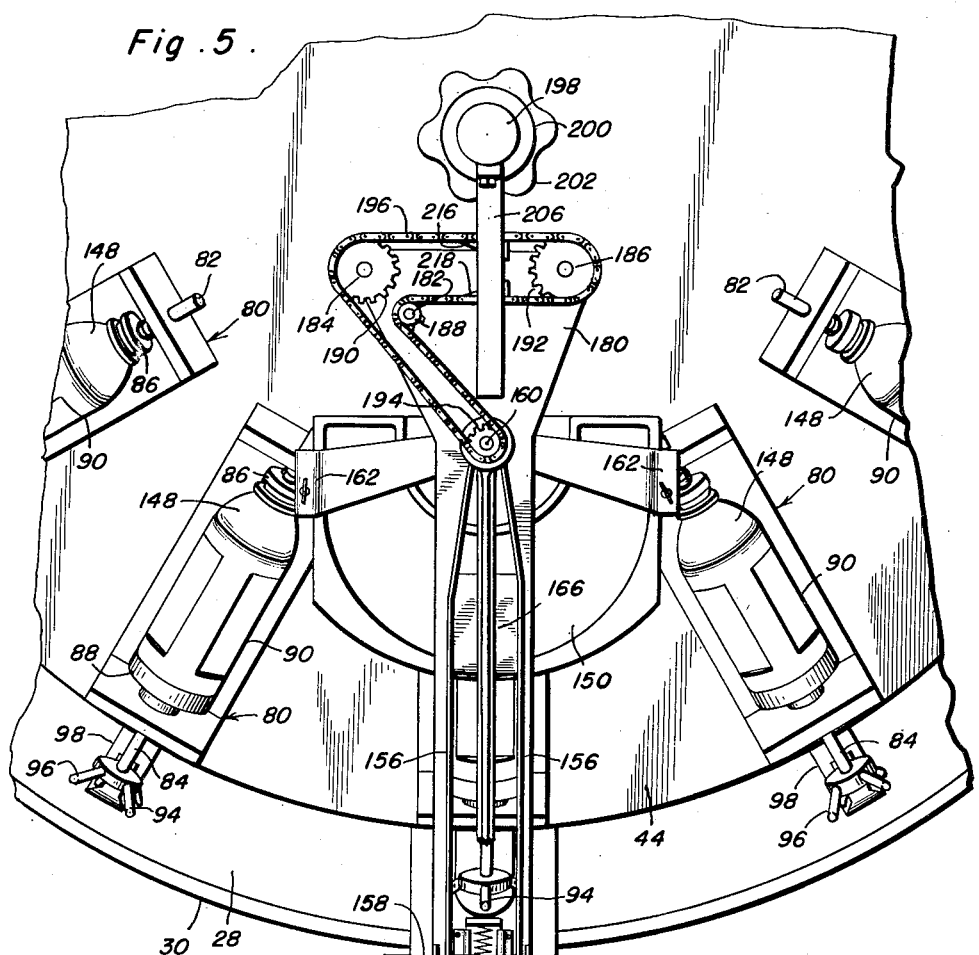
Figure 5 is a fragmentary plan view of the subject shown in Figure 2.

By virtue of its mounting shaft 160, the screen 150 is oscillatory, the oscillation thereof being effected in the following manner:

The inner end portion of the limb 156 assumes the form of a supporting platform 180 which, in turn, supports three upright shafts or pins 182, 184 and 186, carrying sprocket wheels 188, 190 and 192 respectively. Moreover, a further sprocket wheel 194 is secured to the aforementioned shaft 160 and an endless length of sprocket chain 196 passes around the several sprockets, as is best shown in Figures 5 and 10.

The aforementioned shaft 32 is provided at the upper end thereof with an extension shaft 198 which is stationary but carries a sleeve 200, the latter being rotatable with the platform 44. A cam 202, configurated substantially as shown, is secured to the sleeve 200 as at 204, so that it rotates therewith. Moreover, a radially projecting bracket 206 is secured to the shaft 198, this bracket providing bearings for a slidable follower rod 208 including a follower portion 210 which is urged in engagement with the cam 202 by means of a compression spring 212 with which the rod 208 is provided, as is best shown in Figure 2.

Figure 11:
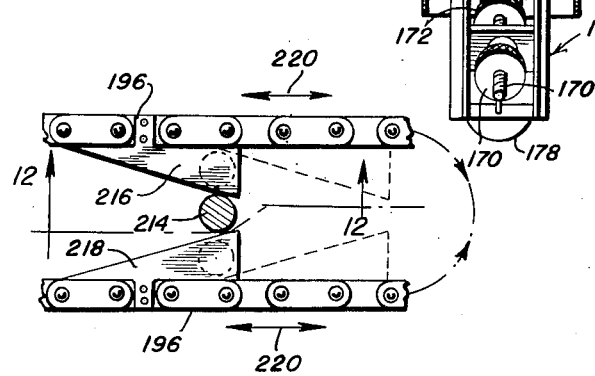
Figure 11 is a fragmentary plan view of means for actuating one of the printing units used in the invention.
Figure 12:
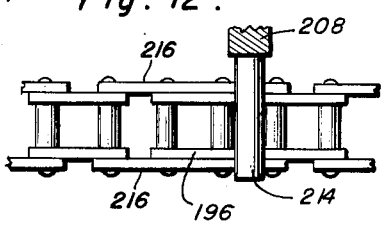
Figure 12 is a cross sectional view, taken substantially in the plane of the line 12—12 in Figure 11.

The rod 212 also carries a downwardly projecting detent 214 which is disposed between a pair of opposed wedges 216, 218 suitably secured to the opposing sides of spaced parallel portions of the aforementioned endless chain 196, as is best illustrated in the accompanying Figure 11.

It will be apparent from the foregoing that as the carrier 36 oscillates as shown at 68 in Figure 4, the printing unit 146 will be oscillated therewith, while the cam 202 will rotate in unison with the platform 44. As a result, the follower 210 engaging the cam 202 will urge the detent 214 in slidable engagement with one of the wedges 216, 218 and then with the other, thereby moving the chain 196 in a reciprocating manner, as indicated by the arrows 220 in Figure 11. This, in turn, will impart an oscillatory motion to the shaft 160 and to the screen 150, as will be clearly understood.

Having thus described the construction of the invention, its method of operation will now be explained.

Referring first to the accompanying Figure 1, the projections beyond the outer periphery of the rim 30 of the housing 28 represent outer end portions of the carrier arms 42, five of which are shown. Of these five, two are illustrated as being equipped with the printing units 102, one with the printing unit 146, while the remaining two at the upper portion of the figure are shown without printing units for purposes of illustration, but actually, these also carry the printing units 102, so that in a five-arm carrier, four printing units 102 and one printing unit 146 are provided. However, it is to be noted that the printing unit 146 is spaced considerably at one side from the adjacent of the units 102, while the spacing of the unit 146 from the adjacent of the units 102 at the remaining side is relatively small, thus providing an open space indicated generally by the reference character 220, which may be referred to as the loading and unloading station.

In this station the containers or bottles are applied to the holders 80, the platform 44 being assumed to rotate in the direction of the arrow 222 (see Figure 1), so that the containers pass under the printing units 102 and the printing units 146 in succession, whereupon they are removed from their holders at the station 220.

The four printing units 102 are provided for successively printing a container or bottle, the indexing means 94, 98 turning the containers 90 from one side to the next medially between the printing units 102, whereby all four sides of the container are printed by the time the container reaches the printing unit 146.

Needless to say, containers having more or less than four sides may be printed, this being facilitated by merely providing more or less of the printing units 102 and more or less of the fingers 96 on the index wheels 94, the number of printing units 102 as well as the number of fingers 96 on each of the wheels 94 conforming to the number of sides on the containers, as will be clearly understood.

The printing unit 146 is primarily intended for printing some inscription, design, or the like, on the neck portion 148 of the containers 90 in one predetermined location (not all around the neck portion), so that only one of the printing units 146 needs to be employed.

Referring to the accompanying Figure 1, matters are so arranged that when the carrier arm supporting the printing unit 146 travels in the direction of the arrow 224 and almost reaches the end of its stroke in that direction, the container in one of the holders on the platform 44 travels in the direction of the arrow 222, while the cam 202 through the medium of the follower 208, causes the screen 150 to oscillate in the direction of the arrow 226, so that a momentary, rolling contact is produced between the screen 150 and the neck portion of the bottle, during which rolling contact the printing operation is effected.

It will be observed, as is best shown in Figure 1, that the printing units 102, 146 are spaced apart sufficiently to facilitate provision of a considerable number of the container holders 80, so that some of the holders are disposed intermediately of the printing units and the containers therein are being indexed, while other holders carrying other containers are disposed under the printing units. In this manner, printing and indexing operations will be effected simultaneously on the several containers during continuous rotation of the platform 44.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a container printing machine, a continuously rotatable platform having a plurality of container holders thereon, an oscillatory carrier mounted concentrically with said platform and including a set of radially projecting arms, and common means for rotating said platform and oscillating said carrier, said means including a driven shaft having a crank pin thereon, one of said arms having a slot formed therein, said crank pin engaging said slot, a ring gear secured to said platform, and a pinion on said shaft, said pinion meshing with said ring gear.

2. The device as defined in claim 1 wherein said holders are indexible and include rotatable indexing wheels having sets of projecting fingers, together with stationary tripping dogs provided in a mutually spaced relation adjacent said platform, said fingers being engageable with said dogs.

3. In a container printing machine including an oscillatory carrier provided with radially projecting arms and formed with slots in said arms, simultaneously rotatable shafts having cranks in engagement with said slots, printing units carried by said arms and including reciprocable actuating rods, and resiliently controlled slides provided on said arms, said slides being engageable with said cranks and operatively engaging said rods.

4. A printing machine for multi-sided containers, comprising an upright standard, a continuously rotatable platform mounted on said standard, an oscillatory carrier provided on said standard and including radial arms projecting beyond the periphery of said platform, a plurality of indexible container holders provided on said platform and including rotatable indexing wheels having sets of projecting fingers, stationary tripping dogs provided adjacent said platform, said fingers being engageable with said dogs, said arms being formed with slots, simultaneously rotatable shafts having cranks and crank pins each engaging one of said slots, a ring gear secured to said platform, pinions on said shafts meshing with said ring gear, means for driving one of said shafts, printing units carried by said arms and including reciprocable actuating rods, said printing units being engageable successively with sides of containers in said holders, and resiliently controlled slides provided on said arms, said slides being engageable with said cranks and operatively engaging said rods.

5. The device as defined in claim 4 wherein said containers include tapered neck portions, and an additional printing unit mounted on said carrier, said last mentioned unit being engageable with the neck portions of the containers, and means responsive to the oscillation of said carrier for actuating said last mentioned printing unit.

6. The device as defined in claim 4 wherein each of said holders comprises a substantially U-shaped yoke, opposed indexing spindles rotatable in the arms of said yoke, and container engaging members provided on said spindles.

7. In a printing machine for containers, the combination of an upright standard, a platform rotatable thereon, a plurality of rotatably indexible container holders on said platform, an oscillatory arm mounted on said standard, a printing unit carried by said arm, means responsive to oscillation of said arm for raising and lowering said printing unit in and out of engagement with containers in said holders, and means for shifting the container-engaging portion of said printing unit in a direction opposite to the rotation of said platform, said last mentioned means comprising a cam mounted on said standard, a slidable follower engaging said cam, a detent on said follower, a pair of shiftable wedges provided at the opposite sides of said detent and engageable thereby, and an operative connection between said wedges and the shiftable container-engaging portion of said unit.

8. The device as defined in claim 7 together with a driven shaft having a crank and a crank pin thereon, said arm having a slot formed therein to receive said pin, said printing unit including a reciprocable actuating rod, and said means for raising and lowering said unit comprising a resiliently controlled slide provided on said arm, said slide being engageable with said crank and operatively engaging said actuating rod.

9. The device as defined in claim 7 together with a pivot pin carrying the container-engaging portion of said printing unit, a sprocket on said pivot pin, and an endless chain engaging said sprocket, said wedges being secured to said chain.

GEORGE R. GROCE.

REFERENCES CITED

The following references are of record in the file of this patent:

UNITED STATES PATENTS

| Number | Name | Date |
| --- | --- | --- |
| 453,773 | Harper | June 9, 1891 |
| 914,234 | Brown | Mar. 2, 1909 |
| 1,006,814 | White | Oct. 24, 1911 |
| 1,904,332 | Sidebotham | Apr. 18, 1933 |
| 2,198,565 | Schutz et al. | Apr. 23, 1940 |